Patented Dec. 25, 1945

2,391,743

UNITED STATES PATENT OFFICE 2,391,743

TREATMENT OF STEROLS

Jacob Rosin, New York, N. Y.

No Drawing. Application November 4, 1944,
Serial No. 562,040

1 Claim. (Cl. 260—397.2)

My invention relates to chromic steroid compounds, and method of forming or producing the same. The present application is a continuation-in-part of my application Serial No. 498,589, filed August 13, 1943, and also a continuation-in-part of my application Serial No. 531,652, filed April 18, 1944, which will mature into Patent No. 2,362,405 under date of November 7, 1944.

Steroid degradation products are widely used in the manufacture of synthetic sex hormones and other organic compounds having a great many pharmacological applications. The presently-known methods of producing the synthetic sex hormones, while effective, are relatively uncertain, expensive, complicated and wasteful of raw materials. With the methods of my invention, I am enabled to produce certain intermediate compounds, chromic steroids, from which the production of the ultimate degradation products, as one field of utility of my new products, may be achieved easily, quickly, positively, at much less expense, much faster, and with greater yields than heretofore. The new products, therefore, are of great benefit and utility and permit the manufacture of synthetic sex hormones much more efficiently than was possible prior to my isolation thereof by my new methods.

These new metalorganic compounds, the chromium oxychloride steroids, have never before been produced and isolated by any known method. Their nature and composition will be discussed below.

From the metalorganic compounds formed by my new methods, I can produce the highly desirable ultimate degradation products simply and easily, this being but one field in which my new products may be used to advantage.

The main object of my invention, therefore, is the formation of chromium oxychloride steroids and method of producing the same, from steroids having an aliphatic side chain in the 17-position.

Another object of my invention is the formation of chromium oxychloride steroids and method of producing the same from steroids having a side chain in the 17-position and methyl groups in the 10- and 13-positions such chromium oxychloride steroids having at least one molecule of chromium oxychloride bound to the side chain.

Another object of my invention is the formation of such chromium oxychloride steroids in isolatable form.

Still another object of my invention is the provision of a method of precipitating in isolatable form such chromium oxychloride steroids from steroids having an aliphatic side chain at the 17-position.

Still another object of my invention is the provision of a method of forming chromium oxychloride steroids by reacting the steroids having a side chain at the 17-position with chromium oxychloride.

Still another object of my invention is the provision of a method of precipitating chromium oxychloride steroids by reaction of steroids having a side chain at the 17-position with chromium oxychloride.

Still another object of my invention is the provision of forming such chromium oxychloride steroids by subjecting the steroids having a side chain at the 17-position to vapors of chromium oxychloride.

Depending on conditions to be detailed below, one or more molecules of chromium oxychloride are permitted to enter into the steroid molecule, care being taken to prevent the decomposition of the chromium oxychloride steroids during the reaction. Thus, in my process, there is substantially a quantitative yield of chromium oxychloride steroids, plus unchanged raw material when the reactions are not completely carried through. Once obtained, however, my metalorganic compounds, the chromium oxychloride steroids, are protected against further reaction since they are very resistant to chromium oxychloride, and the addition of more of the chromium oxychloride would merely result in a reaction between unchanged steroid material and the chromium oxychloride, and not between the chromium oxychloride and the already-formed chromium oxychloride steroids. No oxidative degradation takes place during this reaction in my process, which may be carried out either by direct combination or by precipitation.

Once I have achieved the metalorganic compounds, the chromium oxychloride steroids, I may then subject them to decomposition by water or by other suitable non-oxidative agents. During this decomposition, the chromium salts are split off and simultaneously the degradation of the side chain is effected. There is present, in this particular use of the new products achieved by my process, no oxidative agency, and the degradation is effected by the decomposition of every chromium oxychloride sterol molecule which contains oxygen within itself. Every molecule is subjected to degradation only as far or as long as its own oxygen supply lasts, and there is no other or outside oxidative agent to attack the ultimate products and they are thereby protected.

This field of use of my new product is described and claimed in my co-pending application Serial No. 531,652, which will mature into Patent No. 2,362,405, dated November 7, 1944, as but one instance of the utility of my new product.

With my new product, therefore, I have been able to overcome or obviate all of the disadvantages of the old direct oxidative degradation processes. In the field of sex hormone production, I can now control the nature and extent of the reaction all the way from the formation of the chromium oxychloride steroids to the ultimate degradation products desired. Also, I may eliminate or substantially reduce the use of solvents in the interactions between the sterol-containing material and the hexavalent chromium.

As one example of my process, I may take a thousand (1,000) grams of cholesterol dibromide and spread same in thin layers over the shelves of a cabinet, covering a relatively large surface area. Wide-mouthed dishes containing chromium oxychloride are disposed inside the cabinet on supports above the shelves. The cabinet is then closed and sealed against the atmosphere with paraffin, and kept sealed at room temperatures for twenty-four (24) hours. The cabinet may then be opened and the chromium oxychloride steroid removed, as by scraping, from the shelves. The material is dry, powdery and of light brown color. Its weight is equal to 200% to 210% of the cholesterol dibromide used. No calorific effect was observed during the formation of this product. The chromium oxychloride steroids achieved by this example may be further treated to yield progesterone.

As another example of my method, I may use cholesterol acetate dibromide as the starting material instead of the cholesterol dibromide, and treat same as in the first example. The same dry, brown, powdery material will be achieved, but it will yield upon decomposition and debromination pregnenolone acetate instead of progesterone.

As a third example of my method, I may dissolve say 28.5 grams of cholesterol acetate dibromide in 50 cc. of carbon tetrachloride, chloroform or any similar halogenated hydrocarbon. I thereafter add 10 cc. (19.2 grams) of chromium oxychloride to the solution and agitate the same under control to prevent overheating. Both the cholesterol acetate dibromide and the chromium oxychloride are very soluble in the halogenated hydrocarbon solvents, and a relatively small amount of the solvent will suffice to support the desired reaction. After a while a brown precipitate will be formed. The solvent may be removed easily as by filtration in a filter press, by distillation, or merely permitted to evaporate. Preferably, it is collected for reuse in further batches. The brown precipitate which weighs after drying 47.7 grams will consist of the chromium oxychloride steroids, and the material may be used for the securement of degradation products as outlined in my co-pending application Serial No. 531,652, issued as Patent No. 2,362,405 on November 7, 1944. When more solvent is used to increase the dilution of the solution of steroids and chromium oxychloride, boiling under reflux becomes necessary to achieve the reaction. This procedure is particularly suitable for the introduction of a smaller number of chromium oxychloride molecules into the steroid molecule. Thus, for instance, when a solution of 5.9 grams of cholesterol acetate dibromide in 50 cc. of carbon tetrachloride is mixed with a solution of 2 cc. of chromium oxychloride in 50 cc. of carbon tetrachloride, no reaction takes place at room temperature. By heating to 50° C. only a very slight reaction can be observed. Only by boiling for a longer time under reflux can the reaction followed by precipitation of a voluminous brown precipitate be achieved.

Within my method, other sterols as sitosterol, stigmasterol, steroid genins and other steroid compounds having a side chain may be used instead of cholesterol.

The metalorganic products of my invention, the chromium oxychloride steroids are found to be true reaction products, and not mere addition compounds. This is proven by their decomposition by water. If they were mere addition compounds, the chromium oxychloride would immediately react with water to form chromium trioxide and hydrochloric acid. Chromium trioxide, however, is absolutely unable to attack the steroids when only water is used, (water is a solvent for chromium trioxide but not for the steroids), and if my products were addition compounds the decomposition by water would yield chromium trioxide and unchanged steroid raw material. This does not happen, for (as recited in my co-pending application Serial No. 531,652), the decomposition of the chromium oxychloride steroids by water yields steroid degradation products and large quantities of trivalent chromium salts, thus proving that in my metalorganic compounds, the chromium oxychloride is chemically attached to the steroid molecule, and does not react as would mere physically attached chromium oxychloride (the reaction between chromium oxychloride and water is immediate and strongly exothermic). Therefore, my chromium oxychloride steroids are not mere addition compounds but true reaction products.

As to the position of the chromium oxychloride in the steroid molecule, it is attached to the 17-side chain, since decomposition of the chromium oxychloride steroids affects only the side chain whereas the nucleus and the methyl groups in the 10- and 13-positions remain unaffected.

Having now described my invention, what I claim and desire to secure by Letters Patent is:

The method of treating sterols in order to form and isolate chromium oxychloride sterols, which comprises reacting sterols with chromium oxychloride in the presence of a non-polar solvent for both the sterols and the chromium oxychloride, which solvent is resistant to chromium oxychloride and inert to the chromium oxychloride sterols.

JACOB ROSIN.